April 8, 1947.  C. J. MAGINLEY  2,418,718
EDUCATIONAL APPLIANCE
Filed May 6, 1944

INVENTOR
Clare J. Maginley
BY
ATTORNEY

Patented Apr. 8, 1947

2,418,718

UNITED STATES PATENT OFFICE 2,418,718

EDUCATIONAL APPLIANCE

Clare J. Maginley, Danbury, Conn.

Application May 6, 1944, Serial No. 534,402

4 Claims. (Cl. 35—45)

This invention relates to new and useful improvements in educational appliances and has particular relation to a planetarium adapted for use in class rooms.

An object of the invention is to provide an educational appliance which realistically illustrates the relative positions of various planets to the sun and to one another, the paths of movements of the other planets about the sun, etc.

Another object is to provide an appliance of the character outlined and which is of simple and inexpensive construction, light in weight whereby it may readily be carried from room to room, which may be easily and quickly set up for use and easily and quickly knocked down for transportation or storage, which does not include complicated and expensive operating mechanism, and which may be made in different sizes and to show the relation of all nine important planets or of but certain of them depending on the cost, size, etc.

Other objects and advantages will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

Figure 1:
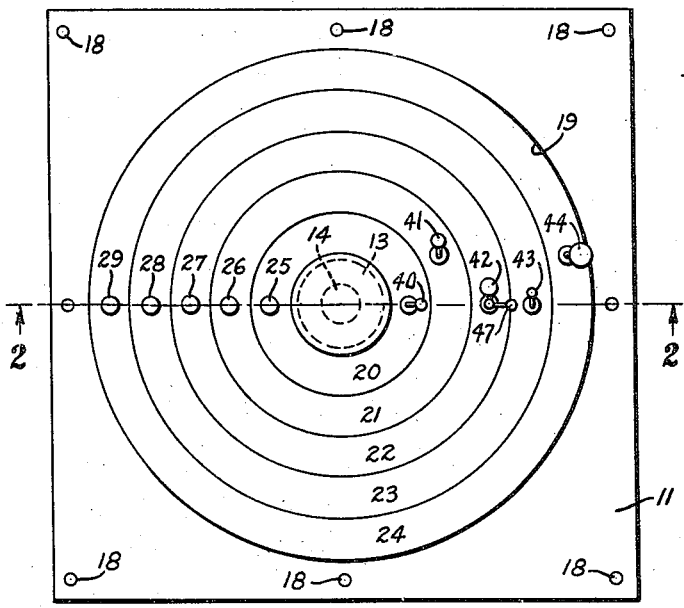
Fig. 1 is a top plan view of an educational appliance made in accordance with the invention.
Figure 2:
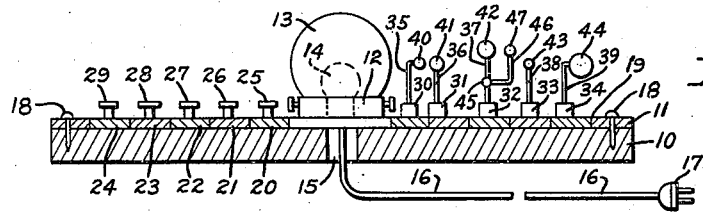
Fig. 2 is a sectional view taken as along the line 2—2 of Fig. 1.

Referring in detail to the drawing and at first more particularly to Figs. 1 and 2, the appliance of the invention is shown as including a base 10 in the form of a square and which may be equipped with folding or detachable legs and thus comprise a part similar to a table top. In the drawing no legs or other means of support for base 10 are disclosed and the appliance of the invention may be placed on a table, desk or the like while in use and in a relatively small storage space when not in use. Base 10 may be of wood or other suitable material.

On the upper side of base 10 is a cover member in the form of a frame 11. This frame may comprise a piece of wood as may the base 10 but preferably the frame is of a fibre board or the like to provide a smooth, tough and inexpensive surface. A mounting 12 for a globe or light bulb cover 13 is located centrally of the base 10 and contains a suitable light bulb socket mounting a light bulb 14. Globe 13 is transparent or at least translucent and it may be colored or the bulb 14 may be colored to give off an orange or yellow light as this cover 13 is to represent the location of the sun.

An opening 15 through the base 10 provides passage for a lead cord 16 equipped with any or the usual plug 17 adapted to be connected with any or the usual service outlet or convenience (not shown). Tacks, screws or the like 18 may be used to secure the frame 11 to the base 10 although it will be clear that any adhesive may be used for the same purpose.

Frame 11 has a relatively large diameter opening 19 therethrough in concentric relation with the globe support 12. In such opening and lying flat against the upper side of the exposed portion of base 10 a series of concentric rings 20, 21, 22, 23 and 24.

These rings are nested or of varying diameters so that ring 20 fits about support 12 while ring 21 fits about ring 20 and ring 22 fits about ring 21, etc. All the rings are in the same plane and the rings may be of the same material as that of the frame 11 and as here disclosed are cut or blanked from a square sheet of material so that the frame and the rings are all formed of the same piece and the rings lie within the planes of the frame.

Knobs or hand pieces 25, 26, 27, 28 and 29 are secured to the respective rings and these knobs are all alike in the drawing and are secured to the rings in any desired way. When using the device or appliance any ring may be turned in its own plane, relative to the other rings, the knobs being a convenient means for this purpose. When a ring is turned it is kept flat in place against the flat upper side of the base 10 and may be regarded as turning about the next innermost ring or within the next outermost ring.

Secured on the upper sides of the rings are blocks or holders 30, 31, 32, 33 and 34, respectively. These holders are all alike and preferably rigidly and permanently secured to the rings. Each holder receives the lower end portion of a vertical support and such supports are shown as comprising pieces of wire. The supports are numbered 35, 36, 37, 38 and 39, respectively, and turnable on the off-set upper ends of the supports are globular or round objects or balls 40, 41, 42, 43 and 44, respectively, representing, respectively, the planets Mercury, Venus, Earth, Mars and Jupiter.

The balls representing the planets are provided with sockets receiving the free upper end portions of the respective supports and each ball is rotatable on its support. The representation of the earth, ball 42, may have the continents painted or printed thereon. With the described construction it will be seen that representations of the planets may be individually given movements about the representation of the sun and further may be individually rotated each on its own axis.

The various rings 20 through 24 may carry pertinent data. For example, they may carry the name of the planet the orbital path of which is represented by movement of the ring, the distance of the planet from the sun, the diameter of the planet, the time it takes to move about the sun, the time it takes to rotate about its own axis, etc. The upper off-set portion of support 37 may be at an inclined to more realistically mount the representation of the earth, i. e., the ball 42.

At a point above the lower end of support 37 a ball or means 45 is turnable about the support and provides for the anchoring of the angularly disposed lower end portion of a wire or support 46 on the upper end of which is rotatably mounted a ball 47, to represent the moon. Thus the satalite relation of the moon to the earth is made clear and by turning of the support 46 about the support 37 the manner of an eclipse may be demonstrated.

While in the above description certain planets have been named it will be understood that this is only by way of example or illustration. A greater or less number of rings and supports may be used depending on the size, selling price, etc., of the appliance. For example, additional rings may be added to carry supports and balls to represent the planets Saturn, Uranus and Neptune. This may be accomplished by having the rings of less width or by using a frame of a larger size or having a larger diameter opening therethrough.

Figure 3:
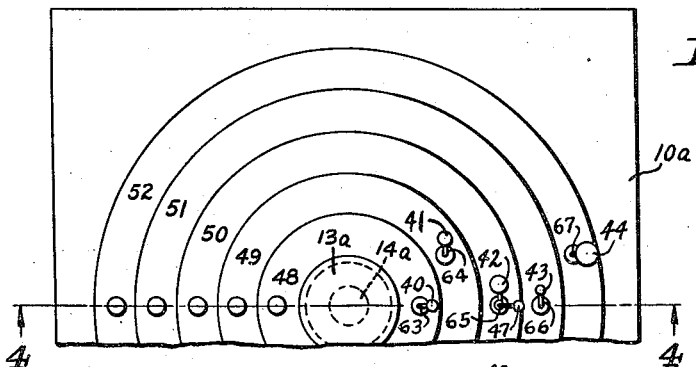
Fig. 3 is a view similar to Fig. 1 but showing only a portion of a modified construction of appliance or device.
Figure 4:
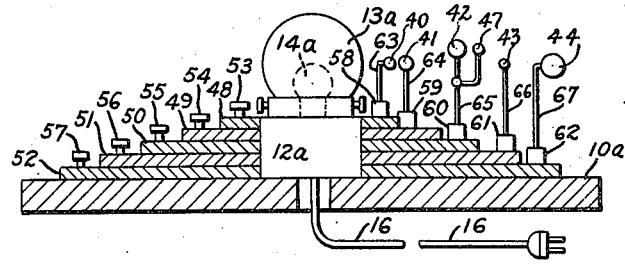
Fig. 4 is a sectional view taken as along the line 4—4 of Fig. 3.

Referring now to Figs. 3 and 4 the appliance is shown as comprising a base 10a similar to the base previously described but the globe or cover 13a is mounted on a somewhat longer or higher device 12a into which the lead cord 16a enters to energize the light bulb 14a. On the upper side of the base 10a are a series of discs 48, 49, 50, 51 and 52 of progressively greater diameters. These discs are disposed one on the other with the largest diameter disc lowermost and against the base 10a.

Clearly the discs 48 through 52 replace the rings 20 through 24 of Figs. 1 and 2 and these discs are provided with knobs or hand pieces 53, 54, 55, 56 and 57 and holders 58, 59, 60, 61 and 62 corresponding with and for the same purpose as the knobs and holders of the figures first described. Supports 63, 64, 65, 66 and 67 are carried by the holders and the latter have sockets opening through their upper sides and receiving the lower end portions of the supports. Thus the holders and supports of Figs. 4 and 3 are of the construction and for the purpose of the holders and supports of Figs. 1 and 2 but the supports of Figs. 3 and 4 are of different heights or lengths to compensate for the stepped positions of the holders resulting from the fact that the discs are disposed on one another.

In the different structures it will be seen that the various holders are movable about the central element or representation of the sun along radially spaced paths in concentric relation to said central element and one another. Each holder has a socket opening through its upper side and removable receiving the lower end portion of its support. With this construction the supports may be removed from the holders for storage or shipping and may be shifted from one holder to another to show relationship of the main planets when a small device is being used.

Thus by removing supports 35 and 36 and shifting support 37 to holder 30 and moving the supports 38 and 39 accordingly, other supports having the proper size of balls thereon to represent Saturn and Uranus may be mounted on holders 33 and 34. With the exception of support 37 the balls may be removed from any of the supports and other sizes of balls mounted thereon to represent other planets.

From this it will be understood that the various balls or representations of the planets are equipped with sockets opening through their sides and receiving the upper off-set portions of the supports. The various holders being independently adjustable may be shifted about, relatively, to have the balls carried thereby positioned to show the relation of the planets at different seasons, etc.

Having thus set forth the nature of my invention, what I claim is:

1. In an educational appliance of the class described, a base, a central element on the upper side of said base and comprising a representation of the sun, a series of holders on the upper side of said base and radially spaced from the center thereof and from one another, means mounting said holders for movement about said central element in radially spaced circular paths concentric with one another and said central element, each of said holders having a socket opening through its upper side, a support on each of said holders and comprising a length of wire having its lower end received in said socket of the holder, a globular representation of a planet on the upper end of each of said supports and rotatable relative thereto, and hand means on each of said holders circumferentially-removed from the planet to move the holder.

2. In an educational appliance of the class described, a base having a flat upper side, an element mounted on said side centrally thereof and comprising a representation of the sun, a series of nested rings about said element in concentric relation thereto and to one another, a support extending upwardly from the upper side of each of said rings, means mounted on the upper end of each of said supports and comprising representations of planets, a hand piece on the upper side of each of said rings, circumferentially-removed from the planets and said rings lying flat against the flat upper side of said base and turnable thereon one within the other whereby through said hand pieces the rings may be moved in circular paths about said central element to carry the supports and planet representations about said central element, and means for maintaining the rings against lateral displacement with respect to the sun element while turning the same relative thereto.

3. In an educational appliance of the class described, a base, a frame on the upper side of said base and comprising a relatively thin sheet of stiff material having a large central opening therethrough, an element to represent the sun on the upper side of said base centrally of the opening through said frame, a series of concentric rings disposed on the upper side of said base in said opening and substantially filling the same, each of said rings turnable independent of the other rings and in concentric circular paths about said central element, and means supporting representations of planets on and in spaced relation to the upper sides of the respective rings, and means on each of said rings circumferentially-removed from the planet to move the rings.

4. In an educational appliance of the class described, a base, a frame on the upper side of said base and comprising a relatively thin sheet of stiff material having a large central opening therethrough, an element to represent the sun on the upper side of said base centrally of the opening through the frame, a series of concentric rings disposed on the upper side of the base in said opening and substantially filling the latter, each of said rings turnable independent of the other rings in concentric circular paths about said central element, a holder rigidly secured to the upper side of each of said rings, each of said holders having a socket opening through its upper side, a support on each of said holders and comprising a length of wire having its lower end received in the socket of its holder, a globular representation of a planet on the upper end of each of said supports and rotatable relative thereto, hand means on the upper side of each of said rings circumferentially spaced from the planets to move the rings, and said rings lying flat against the upper side of said base for movement thereon by said hand pieces in the above described circular paths.

CLARE J. MAGINLEY.

REFERENCES CITED

The following references are of record in the file of this patent:

UNITED STATES PATENTS

| Number | Name | Date |
|---|---|---|
| 375,095 | Pollard | Dec. 20, 1887 |
| 1,506,210 | Welty | Aug. 26, 1924 |
| 1,410,342 | Newell | Mar. 21, 1922 |
| 629,046 | Osman | July 18, 1899 |
| 940,546 | Nickols | Nov. 16, 1909 |
| 1,135,204 | Park | Apr. 13, 1915 |
| 279,439 | Rupert | June 12, 1883 |
| 452,650 | Randall | May 19, 1891 |
| 384,285 | Rugg | June 12, 1888 |
| 327,631 | Whitcomb | Oct. 6, 1885 |
| 477,846 | Rassweiler | June 28, 1892 |
| 522,082 | Nichols | June 26, 1894 |
| 617,589 | Lyons | Jan. 10, 1899 |
| 1,469,664 | Kyle | Oct. 2, 1923 |
| 1,634,289 | Jacobson | July 5, 1927 |
| 892,715 | DeVilbiss | July 7, 1908 |
| 263,886 | Fitz | Sept. 5, 1882 |